US 9,716,427 B2

(12) United States Patent
Ohtake et al.

(10) Patent No.: US 9,716,427 B2
(45) Date of Patent: Jul. 25, 2017

(54) POWER FACTOR CORRECTION CIRCUIT HAVING BOTTOM SKIP CONTROLLER

(71) Applicant: SANKEN ELECTRIC CO., LTD., Niiza-shi, Saitama (JP)

(72) Inventors: Osamu Ohtake, Saitama (JP); Youichi Terasawa, Tokyo (JP); Ryuichi Furukoshi, Asaka (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/972,123

(22) Filed: Dec. 17, 2015

(65) Prior Publication Data
US 2016/0285358 A1 Sep. 29, 2016

(30) Foreign Application Priority Data

Mar. 27, 2015 (JP) ................. 2015-065847

(51) Int. Cl.
*H02M 3/335* (2006.01)
*H02M 1/42* (2007.01)
*H02M 1/00* (2006.01)

(52) U.S. Cl.
CPC .. *H02M 1/4225* (2013.01); *H02M 2001/0032* (2013.01); *H02M 2001/0058* (2013.01); *Y02B 70/126* (2013.01); *Y02B 70/1491* (2013.01); *Y02B 70/16* (2013.01); *Y02P 80/112* (2015.11)

(58) Field of Classification Search
CPC ............... H02M 1/42; H02M 1/4225; H02M 2001/0032; H02M 2001/0058; H02M 3/335; H02M 3/3376; H02M 3/338; H02M 3/3385; H02M 3/33507; H02M 3/33523; H02M 3/33561; H02M 3/33569; H02M 3/3357; H02M 3/33592; H02M 2007/4815; Y02B 70/126; Y02B 70/1475
USPC .................... 363/17, 21.01–21.18
See application file for complete search history.

(56) References Cited

U.S. PATENT DOCUMENTS

| 6,344,986 B1* | 2/2002 | Jain .................. H02M 1/4225 363/21.12 |
| 7,176,660 B2* | 2/2007 | Usui .................. H02M 1/4225 323/207 |
| 2008/0130324 A1* | 6/2008 | Choi ................ H02M 3/33507 363/21.03 |

(Continued)

FOREIGN PATENT DOCUMENTS

JP 2014-131455 7/2014

*Primary Examiner* — Yemane Mehari
(74) *Attorney, Agent, or Firm* — Banner & Witcoff, Ltd.

(57) ABSTRACT

A power factor correction circuit includes: an ON time setting unit, which sets an ON time period of the switching element based on the output voltage; a bottom detection unit, which detects a bottom when a voltage between both ends of the switching element is damped-oscillated while the switching element is being turned off; and a bottom skip controller, which causes the switching element to perform quasi-resonant if a ratio of the ON time period set by the ON time setting unit to a regeneration period of a current flowing through the reactor while the switching element is being turned off is less than or equal to a predetermined value, and turns on the switching element at a timing when a next bottom is reached after one bottom skipped from an initial bottom if the ratio is greater than the predetermined value.

3 Claims, 13 Drawing Sheets

(56) References Cited

U.S. PATENT DOCUMENTS

2009/0310386 A1* 12/2009 Takeuchi ............ H02M 1/4225
363/21.1
2011/0216558 A1* 9/2011 Uno .................... H02M 1/4225
363/21.12

* cited by examiner

IN RATED LOAD STATE

QUASI-RESONANCE

1-Skip

IN LIGHT LOAD STATE

3-Skip

1-Skip

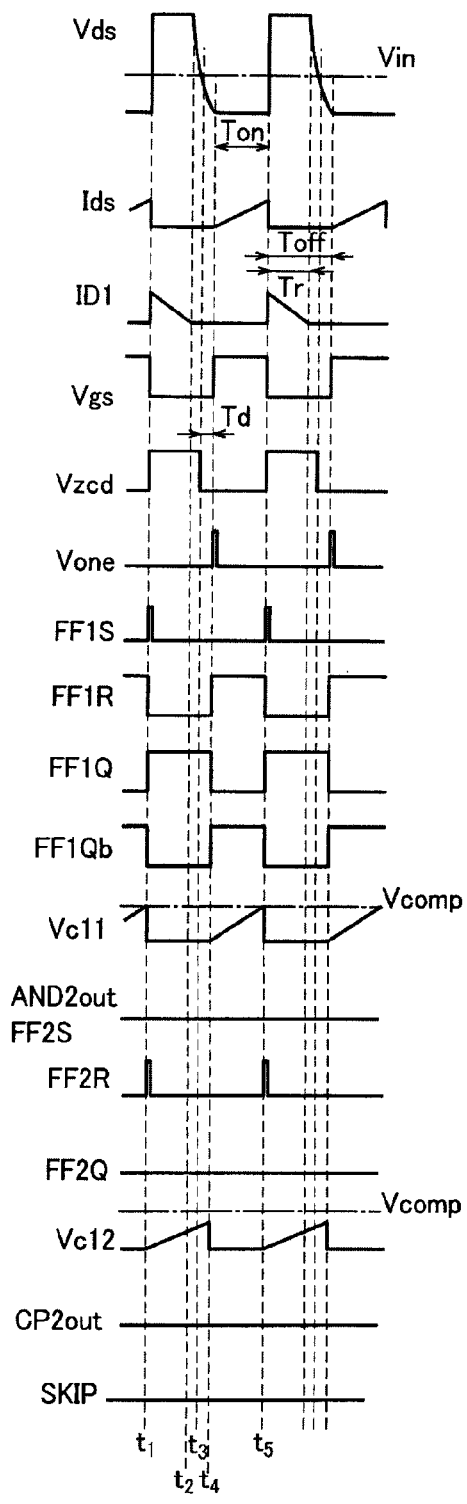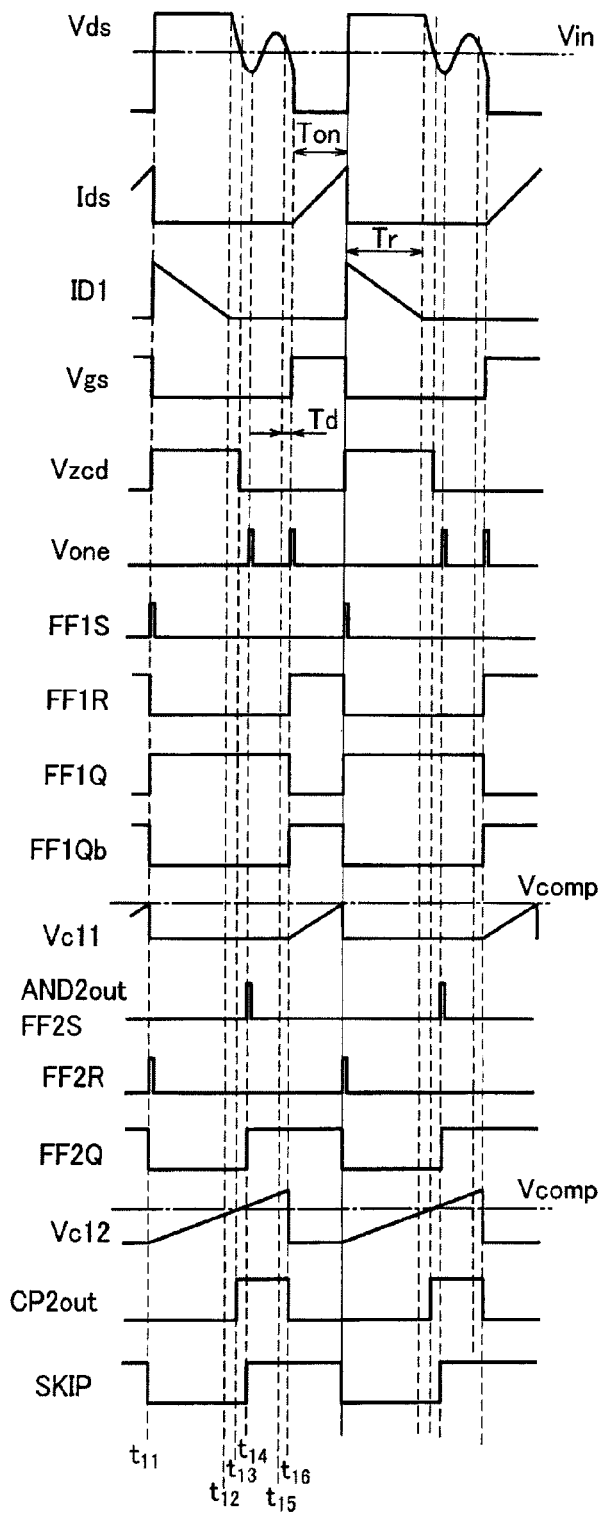

FIG.10

| SKIP INPUT | | NUMBER OF SKIPS |
|---|---|---|
| A | B | |
| H | H | 1 |
| H | L | 1 |
| L | H | 0 |
| L | L | 4 |

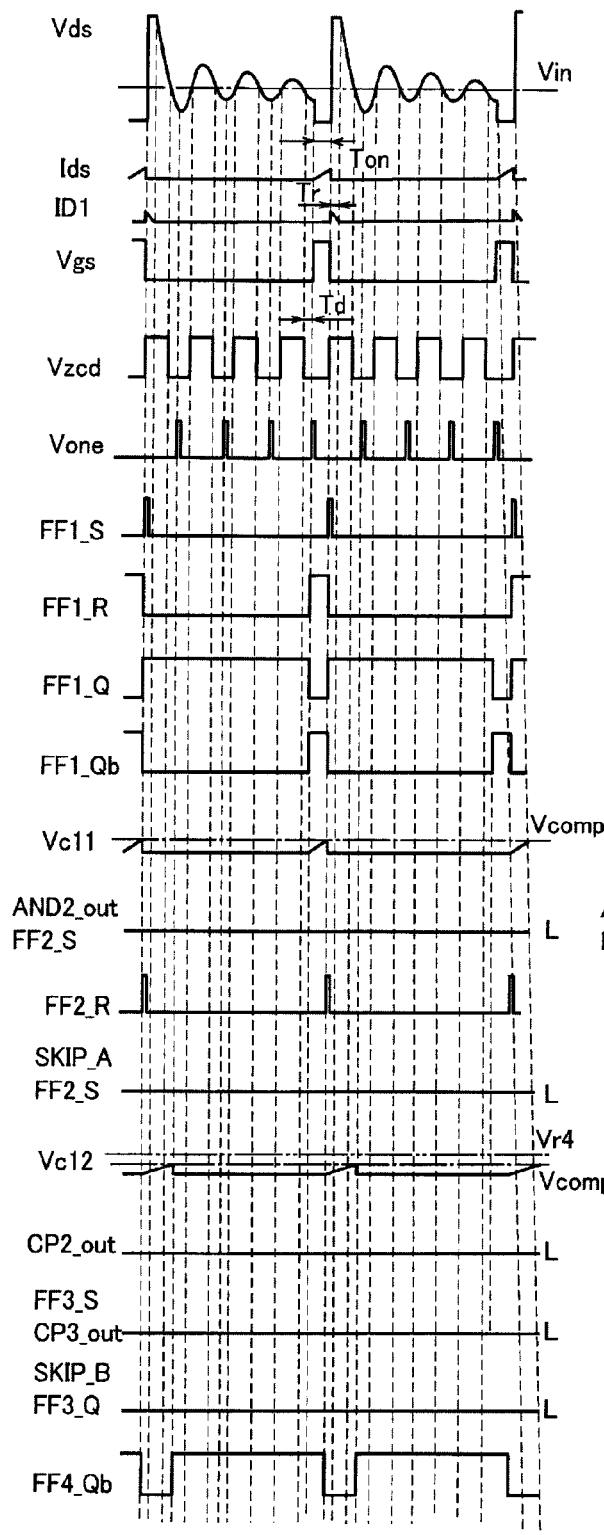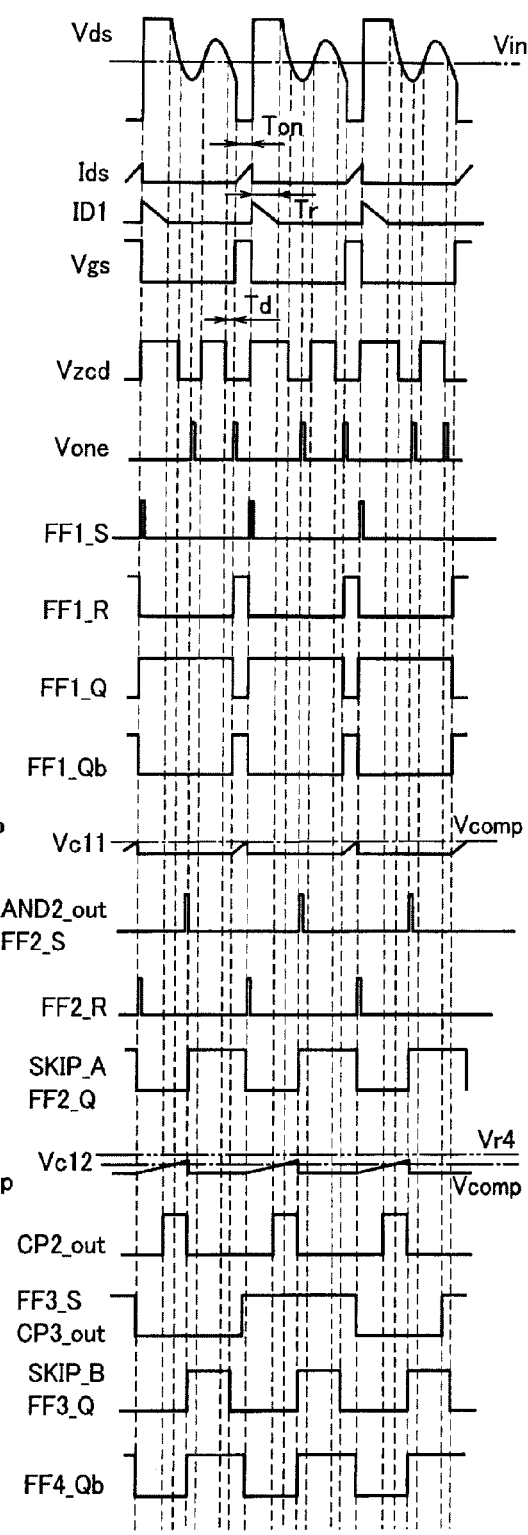

POWER FACTOR CORRECTION CIRCUIT HAVING BOTTOM SKIP CONTROLLER

CROSS-REFERENCE TO RELATED APPLICATION

This application claims priority from Japanese Patent Application No. 2015-065847 filed on Mar. 27, 2015, the entire subject matter of which is incorporated herein by reference.

TECHNICAL FIELD

The present invention relates to a power factor correction circuit and to control of an output voltage of a power factor correction circuit in a light load state.

BACKGROUND

A switching power supply device having a combination of a power factor correction converter and a DC/DC converter is described in, for example, JP-A-2014-131455. This switching power supply device has a load state detection unit for detecting a state of a load in the DC/DC converter. When the load state detection unit detects that the state of the load in the DC/DC converter is a light load state, the DC/DC converter transmits a light load detection signal to the power factor correction converter, and the power factor correction converter decreases frequency. As a result, efficiency in a light load state can be improved.

SUMMARY

However, a background power factor correction circuit detects the state of a load, by using the combination of the power factor correction converter and the DC/DC converter. Due thereto, the power factor correction converter cannot independently perform control.

That is, since the background power factor correction circuit has a configuration for detecting the state of the load of the DC/DC converter and outputting the detected signal to the power factor correction converter, attention in mounting are need for pattern wiring or the like between respective converters and malfunction due to noise may be caused. Accordingly, controls within respective converters are preferable.

The present invention provides a power factor correction circuit that can independently perform control and improve efficiency.

A power factor correction circuit is capable of rectifying an AC voltage into a DC voltage, switching the DC voltage through a series circuit of a reactor and a switching element, and obtaining a predetermined output voltage by rectifying and smoothing regeneration energy of the reactor. The power factor correction circuit includes: an ON time setting unit, which sets an ON time period of the switching element based on the output voltage; a bottom detection unit, which detects a bottom when a voltage between both ends of the switching element is damped-oscillated while the switching element is being turned off; and a bottom skip controller, which causes the switching element to perform quasi-resonant if a ratio of the ON time period set by the ON time setting unit to a regeneration period of a current flowing through the reactor while the switching element is being turned off is less than or equal to a predetermined value, and turns on the switching element at a timing when a next bottom is reached after one bottom skipped from an initial bottom if the ratio is greater than the predetermined value.

According to this disclosure, a bottom skip controller cause a switching element to perform quasi-resonant if a ratio of an ON time period to a regeneration period of a reactor current is less than or equal to a predetermined value, and turns on the switching element at a timing when a next bottom is reached after one bottom skipped from an initial bottom if the ratio is greater than the predetermined value. Accordingly, the power factor correction circuit can independently perform control, thereby improving efficiency.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 6A to 6C are timing charts illustrating quasi-resonance in a case where an input voltage of the power factor correction circuit is low and 1-skip control in a case where the input voltage is high, in a heavy load state according to the third embodiment shown in FIG. 5;

FIG. 10 is a diagram illustrating the number of skips depending on skip input of a skip circuit of the power factor correction circuit according to the fifth embodiment shown in FIG. 9; and FIGS. 11A to 11C are timing charts illustrating 3-skip control in a case where an input voltage is low and 1-skip control in a case where the input voltage is high, in a light load state of the power factor correction circuit according to the fifth embodiment shown in FIG. 9.

DETAILED DESCRIPTION

Hereinafter, several embodiments of a power factor correction circuit according to this disclosure will be described in detail with reference to the attached drawings.

First Embodiment

Figure 1:
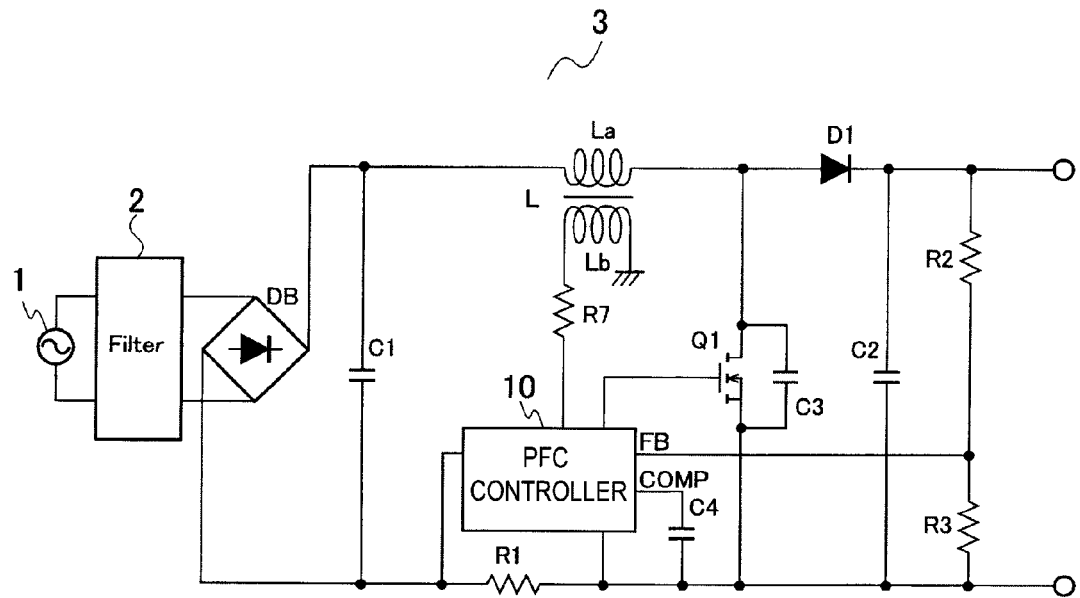
FIG. 1 is a circuit diagram of a power factor correction circuit according to a first embodiment of this disclosure.

FIG. 1 is a circuit diagram of a power factor correction circuit according to a first embodiment of this disclosure. In the power factor correction circuit according to the first embodiment illustrated in FIG. 1, a filter 2 eliminates noise included in an Alternating Current (AC) voltage from an AC power source 1. A full-wave rectifier circuit DB rectifies the AC voltage from the filter 2 and outputs the rectified AC voltage to both ends of a capacitor C1.

A series circuit of a reactor L, a switching element Q1, and a current detection resistor R1 is connected between both ends of the capacitor C1. The switching element Q1 is implemented as a MOSFET, and a series circuit of a diode D1 and a capacitor C2 is connected between a drain and a source of the switching element Q1.

A series circuit of a resistor R2 and a resistor R3 is connected between both ends of the capacitor C2. The reactor L is composed of a primary winding La and an auxiliary winding Lb which are electromagnetically connected to each other. A first end of the primary winding La is connected to a first end of the capacitor C1 and a second end of the primary winding La is connected to the drain of the switching element Q1 and to an anode of the diode D1. A first end of the auxiliary winding Lb is connected to the PFC controller 10 through a resistor R7, and a second end of the auxiliary winding Lb is grounded.

The PFC controller 10 corrects a power factor while setting an output voltage to a predetermined value, by ON/OFF controlling the switching element Q1 based on an output voltage between the resistor R2 and the resistor R3, a voltage between both ends of the current detection resistor R1, and a current from the auxiliary winding Lb of the reactor L.

Figure 2:
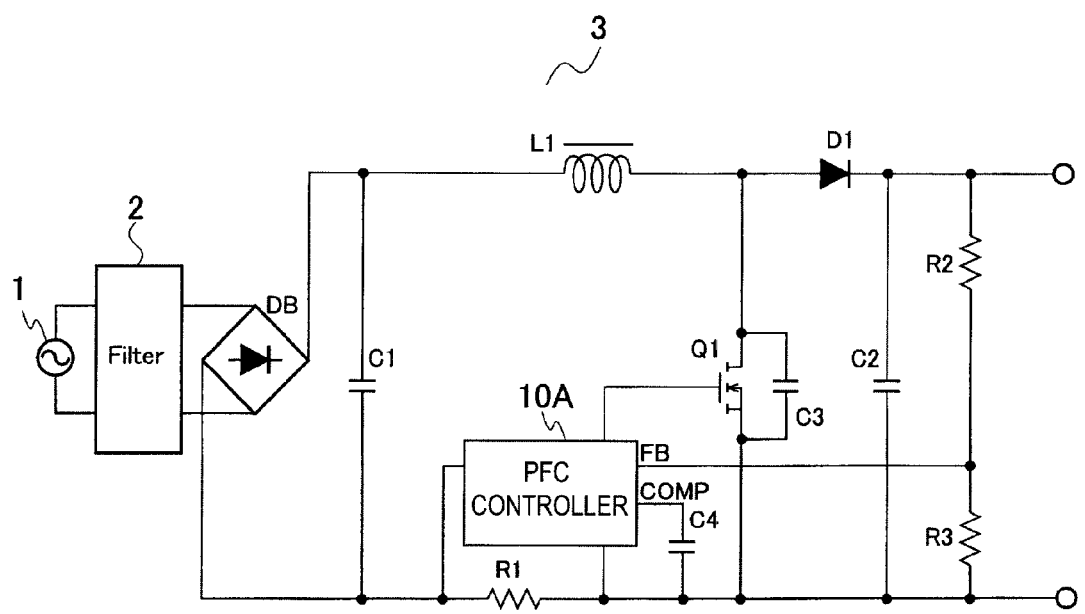
FIG. 2 is a circuit diagram showing a modified example of the power factor correction circuit according to the first embodiment of this disclosure.

Compared to the power factor correction circuit shown in FIG. 1, a power factor correction circuit shown in FIG. 2 is implemented using only the primary winding of the reactor L without having the auxiliary winding of the reactor L, and includes a PFC controller 10A. The PFC controller 10A corrects a power factor while setting an output voltage to a predetermined value, by ON/OFF controlling a switching element Q1 based on an output voltage between a resistor R2 and a resistor R3 and a voltage between both ends of a resistor R1.

Since functions of the PFC controller 10 and the PFC controller 10A according to this disclosure are identical to each other, the function of the PFC controller 10 is described here.

Figure 3A:
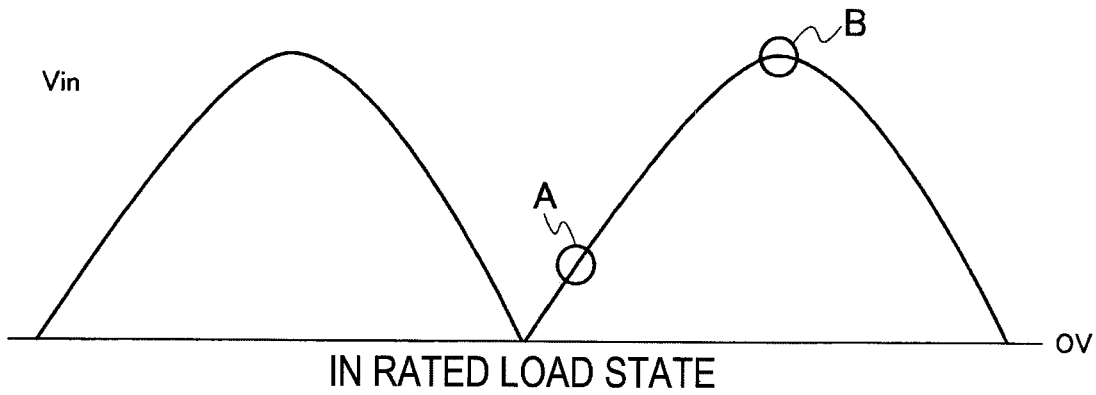
FIGS. 3A to 3C are timing charts illustrating quasi-resonance in a case where an input voltage is low and 1-skip control in a case where the input voltage is high, in a heavy load state of the power factor correction circuit according to the first embodiment of this disclosure.
Figure 3B:
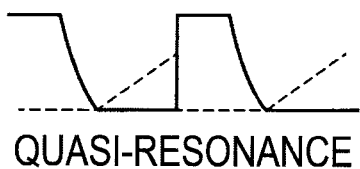
Figure 3C:
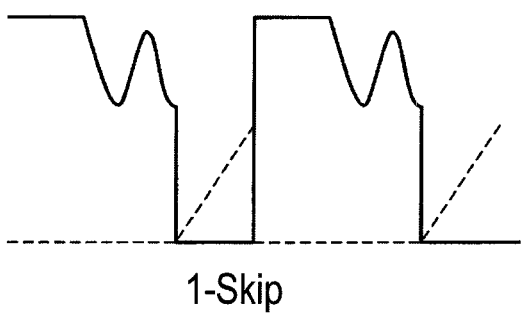

The PFC controller 10 according to the first embodiment is operated, as shown in FIGS. 3A to 3C, in a heavy load state (rated load state). That is, when an input voltage Vin (voltage of the full-wave rectifier circuit DB) is low (part A in a full-wave rectified waveform of FIG. 3A), the PFC controller 10 causes the switching element Q1 to perform quasi-resonant, as shown in FIG. 3B. When the input voltage Vin is high (part B in a full-wave rectified waveform of FIG. 3A), the PFC controller 10 causes the switching element Q1 to perform 1-skip control, as shown in FIG. 3C.

In quasi-resonance, as shown in FIG. 3B, if a drain-source voltage of the switching element Q1 becomes an initial bottom which is a minimum value while the drain-source voltage is being damped-oscillated while the switching element Q1 is being turned off, the switching element Q1 is turned on.

A "1-skip control" is a control to turn on the switching element Q1 when the drain-source voltage of the switching element Q1 becomes a next bottom after one bottom skipped from an initial bottom at which the drain-source voltage becomes a minimum value when the switching element Q1 is turned off.

Second Embodiment

Figure 4A:
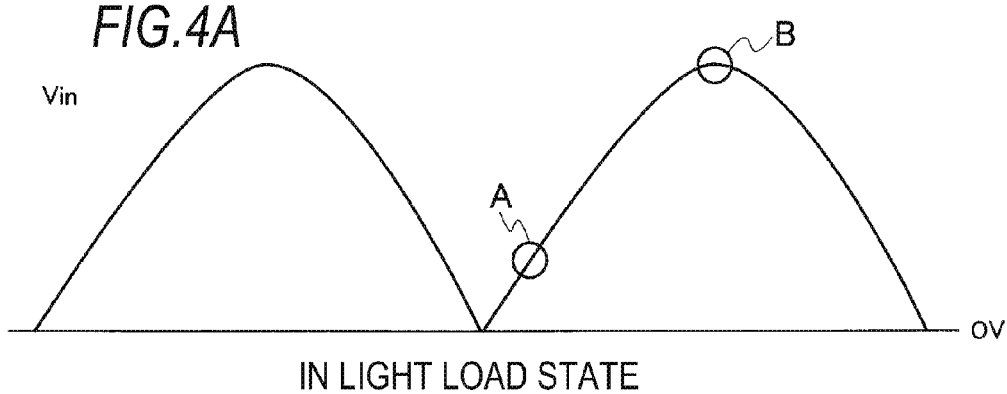
FIGS. 4A to 4C are timing charts illustrating 3-skip control in a case where an input voltage is low and 1-skip control in a case where the input voltage is high, in a light load state of a power factor correction circuit according to a second embodiment of this disclosure.
Figure 4B:
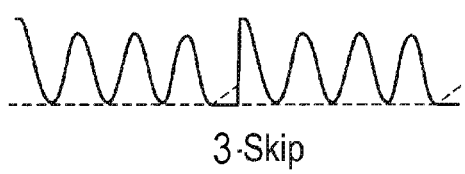
Figure 4C:
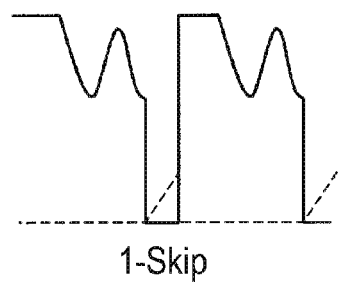

In a light load state, The PFC controller 10 in the second embodiment is operated, as shown in FIGS. 4A to 4C. That is, when the input voltage Vin is low (part A in a full-wave rectified waveform of FIG. 4A), the PFC controller 10 controls the switching element Q1 to skip three bottoms, as shown in FIG. 4B. When the input voltage Vin is high (part B in a full-wave rectified waveform of FIG. 4A), the PFC controller 10 controls the switching element Q1 to skip one bottom, as shown in FIG. 4C.

Third Embodiment

Figure 5:
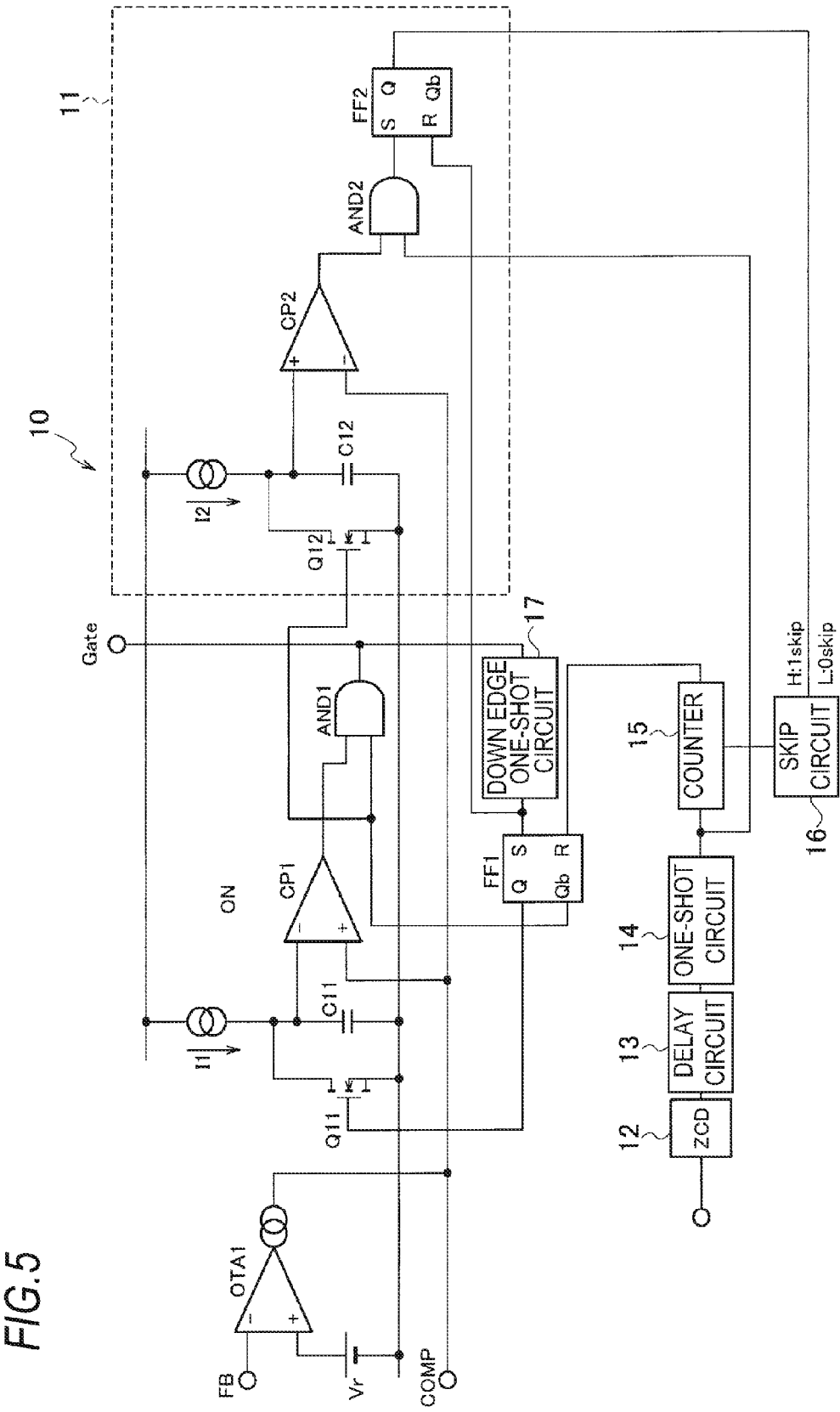
FIG. 5 is a detailed circuit diagram of a PFC controller in a heavy load state of a power factor correction circuit according to a third embodiment of this disclosure.

FIG. 5 is a detailed circuit diagram of a PFC controller in a heavy load state of a power factor correction circuit according to a third embodiment of this disclosure. The power factor correction circuit according to the third embodiment is a detailed example of the PFC controller 10 shown in FIG. 1.

The PFC controller 10a shown in FIG. 5 includes current sources I1 and I2, capacitors C11 and C12, flip-flop circuits FF1 and FF2, comparators CP1 and CP2, transistors Q11 and Q12, AND circuits AND1 and AND2, a Zero-cross Current Detector (ZCD) 12, a delay circuit 13, a one-shot circuit 14, a counter 15, a skip circuit 16, a down edge one-shot circuit 17, an operational amplifier OTA1, and a reference voltage Vr.

The reference voltage Vr is connected to a non-inverting terminal of the operational amplifier OTA1, an FB terminal is connected to an inverting terminal of the operational amplifier OTA1, and the operational amplifier OTA1 and the reference voltage Vr constitute an error amplifier for an output voltage. Further, a capacitor C4 connected to a COMP terminal is a phase compensation capacitor.

The current source I1 is connected in series to the capacitor C11, and a drain and a source of the transistor Q11 implemented as a MOSFET are connected to both ends of the capacitor C11. A gate of the transistor Q11 is connected to an output terminal Q of the flip-flop circuit FF1. An inverting terminal (−) of the comparator CP1 is connected to a first end of the capacitor C11, a non-inverting terminal (+) of the comparator CP1 is connected to the COMP terminal, and an output terminal of the comparator CP1 is connected to one input terminal of the AND circuit AND1.

The other input terminal of the AND circuit AND1 is connected to an inverting output terminal Qb of the flip-flop circuit FF1 and to a gate of the transistor Q12 implemented as a MOSFET, and an output terminal of the AND circuit AND1 is connected to the gate of the switching element Q1 and to an input terminal of the down edge one-shot circuit 17. An output terminal of the down edge one-shot circuit 17 is connected to a set terminal S of the flip-flop circuit FF1.

The current source I2 is connected in series to the capacitor C12, and a drain and a source of the transistor Q12 implemented as an MOSFET are connected to both ends of the capacitor C12. A non-inverting terminal of the comparator CP2 is connected to a first end of the capacitor C12, an inverting terminal of the comparator CP2 is connected to the COMP terminal, and an output terminal of the comparator CP2 is connected to one input terminal of the AND circuit AND2. The current source I2, the capacitor C12, the transistor Q12, and the comparator CP2 set a regeneration period of a current flowing through the reactor L after the switching element Q1 is turned off.

The other input terminal of the AND circuit AND2 is connected to an output terminal of the one-shot circuit 14 and to an input terminal of the counter 15, and an output terminal of the AND circuit AND2 is connected to a set terminal S of the flip-flop circuit FF2. A reset terminal R of the flip-flop circuit FF2 is connected to a set terminal S of the flip-flop circuit FF1 and to an output terminal of the down edge one-shot circuit 17, and an output terminal Q of the flip-flop circuit FF2 is connected to the skip circuit 16.

The current source I2, the capacitor C12, the transistor Q12, the comparator CP2, the AND circuit AND2, and the flip-flop circuit FF2 constitute a regeneration period detection circuit 11.

An output terminal of the AND circuit AND1 is connected to a gate of the switching element Q1 and to an input terminal of the down edge one-shot circuit 17. An output terminal of the down edge one-shot circuit 17 is connected to a set terminal S of the flip-flop circuit FF1.

The ZCD12, the delay circuit 13, and the one-shot circuit 14 constitute a bottom detection unit for detecting a bottom when a both-end voltage of the drain-source of the switching element is damped-oscillated while the switching element is being turned off. The current source I1, the capacitor C11, the transistor Q11, and the comparator CP1 constitute an ON-time setting unit for setting ON time period of the switching element Q1 based on the detected bottom.

The current source I2, the capacitor C12, the transistor Q12, the comparator CP2, the AND circuit AND2, the flip-flop circuit FF2, the skip circuit 16, and the counter 15 constitute a bottom skip controller.

The bottom skip controller causes the switching element Q1 to perform quasi-resonant if a ratio of the ON time period Ton of the switching element Q1 to a regeneration period Tr of the current flowing through the reactor L while the switching element is being turned off Q1 is less than or equal to a predetermined value (e.g. 1), and turns on the switching element Q1 at a timing when a next bottom is reached after one bottom skipped from an initial bottom if the ratio is greater than the predetermined value (referred to as '1-skip control').

The PFC controller 10 fixes the ON time period Ton of the switching element Q1. In a case where the input voltage is low, the OFF time point Toff of the switching element Q1 is shortened, and in a case where the input voltage is high, the OFF time of the switching element Q1 is lengthened. In this embodiment, the predetermined value that is the ratio of the ON time period Ton of the switching element Q1 to the regeneration period Tr of the current flowing through the reactor L while the switching element Q1 is being turned off is set to 1.

Figure 6A:
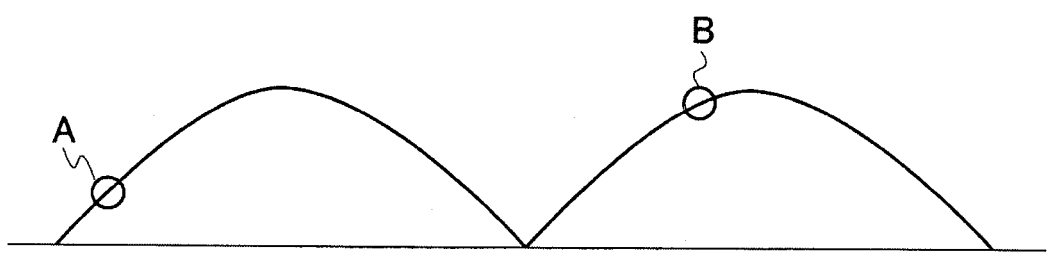

FIGS. 6A to 6C are timing charts illustrating quasi-resonance in a case where an input voltage of the power factor correction circuit is low and 1-skip control in a case where the input voltage is high, in a heavy load state, according to the third embodiment shown in FIG. 5. FIG. 6B shows timing charts of each part showing quasi-resonance in a case where the input voltage is low (part A in a full-wave rectified waveform of FIG. 6A) in a heavy load state. FIG. 6C shows timing charts of each part showing 1-skip control in a case where the input voltage is high (part B in a full-wave rectified waveform of FIG. 6B) in a heavy load state.

In FIGS. 6B and 6C, Vds denotes a drain-source voltage of the switching element Q1, Ids denotes a drain-source current of the switching element Q1, ID1 denotes a current flowing through the diode D1, Vgs denotes a gate-source voltage of the switching element Q1, Vzcd denotes a detected voltage of the ZCD12, Vone denotes a voltage of the one-shot circuit 14, FF1S denotes a voltage of the set terminal of the flip-flop circuit FF1, FF1R denotes a voltage of the reset terminal R of the flip-flop circuit FF1, FF1Q denotes a voltage of the output terminal Q of the flip-flop circuit FF1, FF1Qb denotes a voltage of the inverting output terminal Qb of the flip-flop circuit FF1, Vc11 denotes a voltage of the capacitor C11, FF2S denotes a voltage of the set terminal S of the flip-flop circuit FF2, FF2R denotes a voltage of the reset terminal R of the flip-flop circuit FF2, FF2Q denotes a voltage of the output terminal Q of the flip-flop circuit FF2, FF2Qb denotes a voltage of the inverting output terminal Qb of the flip-flop circuit FF2, Vc12 denotes a voltage of the capacitor C12, CP2out denotes an output of the comparator CP2, and SKIP denotes an output of the skip circuit 16.

A period, in which the current ID1 flowing through the diode D1 is positive, corresponds to a regeneration period during which the current flows through the reactor L.

Next, operations of respective units in a case where the input voltage is low will be described with reference to the timing chart of FIG. 6B. Here, the PFC controller 10 fixes the ON time period of the switching element Q1 and, in a case where the input voltage is low, controls the OFF time of the switching element Q1 to a short time.

First, when the switching element Q1 is turned on, a current flows through a path in order of DB, La, Q1, R1 and DB, and then energy is excited in the reactor L. Further, the voltage Vc11 of the capacitor C11 gradually increases due to the current flowing from the current source I1. At time point t1, the voltage Vc11 of the capacitor C11 becomes a voltage Vcomp of the COMP terminal, and thus the comparator CP1 outputs an L level to the AND circuit AND1.

The AND circuit AND1 outputs an L level to the gate of the switching element Q1 and to the down edge one-shot circuit 17. Accordingly, the switching element Q1 is turned off, thus increasing the drain-source voltage Vds. The down edge one-shot circuit 17 outputs a one-shot pulse to the set terminal S of the flip-flop circuit FF1 in response to the L level from the AND circuit AND1. As a result, since an H level is output from the output terminal Q of the flip-flop circuit FF1 to the gate of the transistor Q11, the transistor Q11 is turned on. Thus, the capacitor C11 is discharged and the voltage Vc11 becomes zero.

At this time, since the L level is output from the inverting output terminal Qb of the flip-flop circuit FF1 to the gate of the transistor Q12, the transistor Q12 is turned off. Accordingly, the voltage Vc21 of the capacitor C12 gradually increases due to the current flowing from the current source I2 from time point t1.

Here, since the current of the current source I2 is set to be lower than that of the current source I1, the voltage of the capacitor C12 is low and does not reach the voltage Vcomp of the COMP terminal even at time point t4. Accordingly, the comparator CP2 outputs always an L level to the AND circuit AND2, and thus the flip-flop circuit FF1 outputs an L level to the skip circuit 16. As a result, the skip circuit 16 outputs 0-skip to the counter 15.

At time point t1, excitation energy accumulated in the reactor L is emitted, and then the current flows through a path in order of La, D1, and C2. The symbol Tr shown in FIGS. 6B and 6C shows a regeneration period of the current flowing through the reactor L. As shown in FIGS. 6B and 6C, in a case where the input voltage is low, the regeneration period of the current flowing through the reactor L is shortened. In a case where the input voltage is high, the regeneration period of the current flowing through the reactor L is lengthened.

When the current Ids flowing through the switching element Q1 becomes zero, the ZCD12 detects that polarity of a voltage output from the auxiliary winding Lb through the resistor R7 is inverted, and then outputs a zero detection signal. The zero detection signal rises at time point t1 and falls to a zero volt at time point t3, on the basis of the input voltage Vin.

The delay circuit 13 delays the zero detection signal from the ZCD12 by a predetermined time point td and outputs the delayed zero detection signal to the one-shot circuit 14.

At a timing of falling (time point t4) of the zero detection signal output from the delay circuit 13 which is delayed by the predetermined time point td, i.e. at a bottom of the voltage Vds, the one-shot circuit 14 generates a one-shot pulse and outputs the one-shot pulse to the counter 15.

The counter 15 receives the one-shot pulse from the one-shot circuit 14, and outputs the out-shot pulse to the reset terminal R of the flip-flop circuit FF1 according to the number of skips corresponding to a 0-skip or a 1-skip output from the skip circuit 16. In a case where the input voltage is low, the regeneration period is short, as described above, and thus 0-skip is received from the skip circuit 16. In a case of 0-skip, when the first one-shot pulse is input, i.e. at time point t4, the counter 15 outputs a first one-shot pulse to the reset terminal R of the flip-flop circuit FF1, without skipping the one-shot pulse.

At time point t4, when the one-shot pulse is input to the reset terminal R of the flip-flop circuit FF1, an L level is output from the output terminal Q of the flip-flop circuit FF1 to the transistor Q11 and an H level is output from the inverting output terminal Qb to the transistor Q12. Accordingly, the transistor Q11 is turned off and the transistor Q12 is turned on.

At this time, during a period from time point t4 to time point t5, the voltage Vc11 of the capacitor C11 gradually increases due to the current flowing from the current source I1. Meanwhile, the comparator CP1 outputs an H level to the switching element Q1 through the AND circuit AND1 and thus the switching element Q1 is turned on.

At time point t5, when the voltage Vc11 of the capacitor C11 becomes Vcomp, a falling pulse is output from the AND circuit AND1 to the down edge one-shot circuit 17, and then the down edge one-shot circuit 17 outputs a one-shot pulse to the set terminal S of the flip-flop circuit FF1. Accordingly, since the L level is output from the inverting output terminal Qb of the flip-flop circuit FF1 to the gate of the transistor Q12, the transistor Q12 is turned off and then the capacitor C12 is charged with the current flowing from the current source I2.

Since the current of the current source I2 is set to be lower than current of the current source I1, the voltage of the capacitor C12 is low, and then does not reach the voltage Vcomp of the COMP terminal. Accordingly, the comparator CP2 outputs an L level to the AND circuit AND2 all the time, and thus the flip-flop circuit FF1 outputs an L level to the skip circuit 16. Therefore, the skip circuit 16 outputs 0-skip to the counter 15.

That is, in a case where the input voltage is low, if the ratio of the ON time period Ton of the switching element Q1 to the regeneration period Tr of the current flowing through the reactor L while the switching element Q1 is being turned off is less than or equal to a predetermined value, the switching element Q1 performs quasi-resonant.

Next, an operation performed in a case where the input voltage is high is described with reference to FIG. 6C. In a case where the input voltage is high, if the ratio of the ON time period Ton of the switching element Q1 to the regeneration period Tr is greater than the predetermined value, the PFC controller 10 turns on the switching element Q1 at a timing at a timing when a next bottom is reached after one bottom skipped from an initial bottom.

First, in a case where the input voltage is high, the voltage Vds while the switching element Q1 is turned off is damped-oscillated around the input voltage Vin, as shown in FIG. 6C, and thus plural bottoms are generated. Accordingly, the one-shot circuit 14 detects the bottoms of the voltage Vds at time points t14 and t16 and then generates one-shot pulses.

In a case where the input voltage is high, the voltage of the capacitor C12 exceeds the voltage Vcomp of the COMP terminal during a period from time point t13 to time point t16, so that the comparator CP2 outputs an H level to the set terminal S of the flip-flop circuit FF2 through the AND circuit AND2. Then, the flip-flop circuit FF2 outputs an H level to the skip circuit 16 and the skip circuit 16 outputs a 1-skip to the counter 15. According to 1-skip control, when a second one-shot pulse is input after skipping a first one-shot pulse from the one-shot circuit 14 by one pulse, as shown in 6C, i.e. at time point t16, the counter 15 outputs the second one-shot pulse to the reset terminal R of the flip-flop circuit FF1. Accordingly, the switching element Q1 is turned on through the AND circuit AND1, and a subsequent operation thereof is identical to that performed in a case where the input voltage is low.

In this way, the PFC controller 10 causes the switching element Q1 to perform quasi-resonant if the ratio of the ON time period Ton of the switching element Q1 to the regeneration period Tr of the current flowing through the reactor L while the switching element Q1 is being turned off is less than or equal to a predetermined value, and turns on the switching element Q1 at a timing when a next bottom is reached after one bottom skipped from an initial bottom if the ratio is greater than the predetermined value. Therefore, the power factor correction circuit independently performs control, thereby improving efficiency.

Fourth Embodiment

Figure 7:
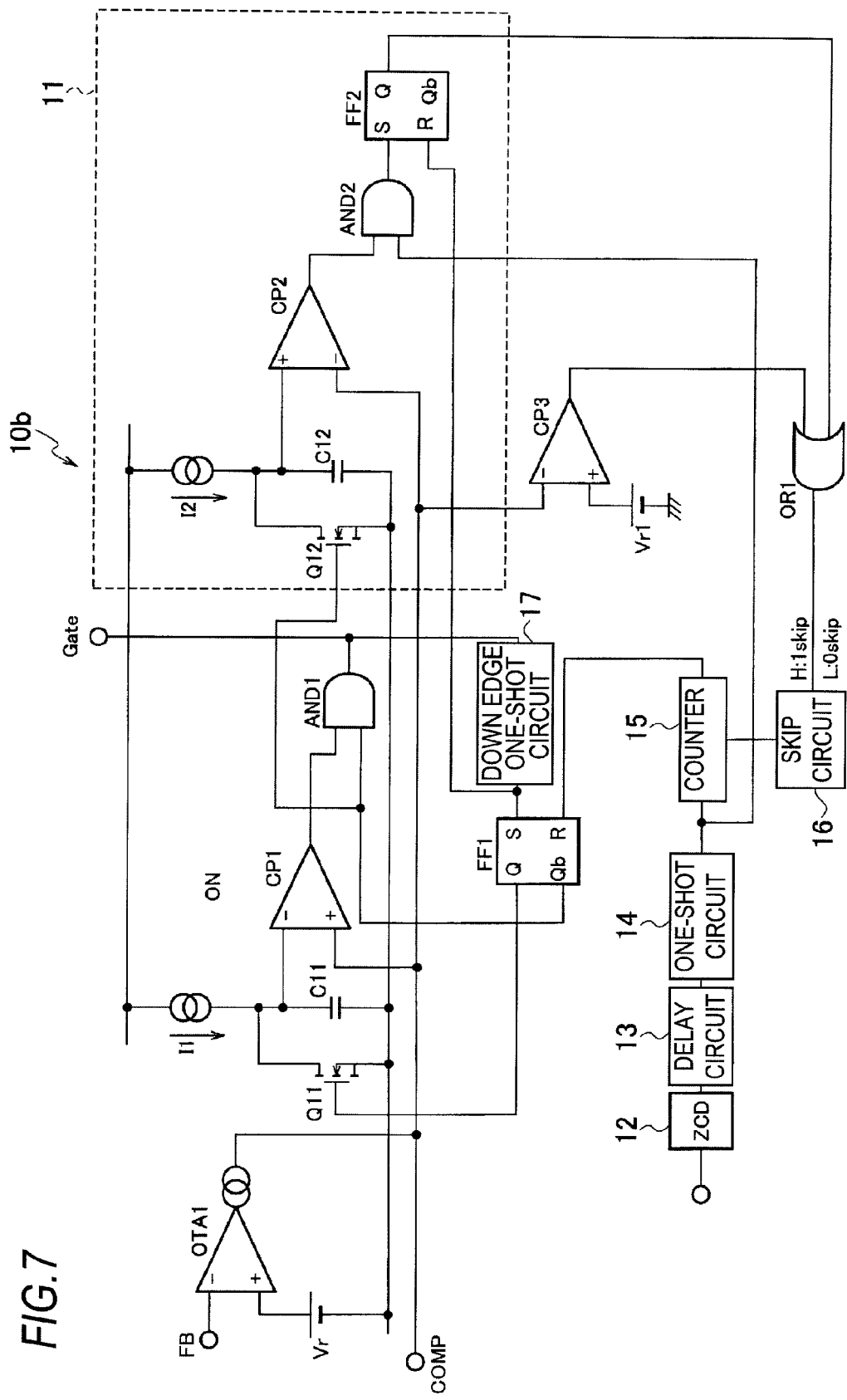
FIG. 7 is a detailed circuit diagram of a PFC controller for performing 1-skip control in a light load state of a power factor correction circuit according to a fourth embodiment of this disclosure.

FIG. 7 is a detailed circuit diagram of a PFC controller for performing 1-skip control in a light load state of a power factor correction circuit according to a fourth embodiment of this disclosure. The power factor correction circuit according to the fourth embodiment of this disclosure shown in FIG. 7 is characterized in that the PFC controller 10a shown in FIG. 5 is replaced with a PFC controller 10b. In the PFC controller 10b, a comparator CP3 and an OR circuit OR1 are further provided, in addition to the configuration of the PFC controller 10a. The comparator CP3 constitutes a light load determination unit.

The comparator CP3 determines whether or not a load is a light load by comparing a voltage of a COMP terminal with a voltage of a reference voltage Vr1, and then outputs a load state determination signal to the OR circuit OR1. The OR circuit OR1 takes a logical sum of the load state determination signal from the comparator CP3 and an output of the flip-flop circuit FF2, and outputs the logical sum to the skip circuit 16.

According to this configuration, when the load becomes a light load, the voltage of the COMP terminal becomes less than the reference voltage Vr1. Therefore, the comparator CP3 determines that the load is a light load and outputs an H level to the skip circuit 16 through the OR circuit OR1. Accordingly, the skip circuit 16 outputs a 1-skip to the counter 15.

Figure 8A:
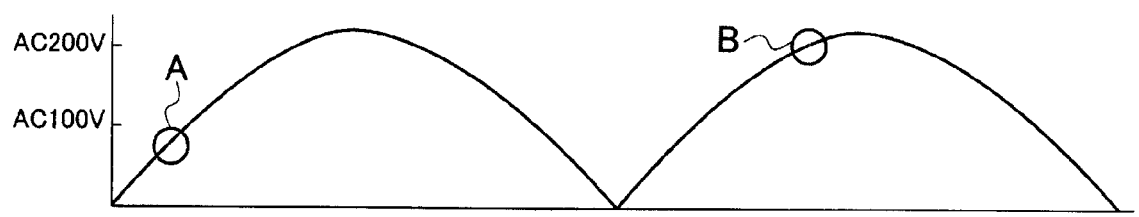
FIGS. 8A to 8C are timing charts illustrating 1-skip control in a case where the input voltage of the power factor correction circuit is low and in a case where the input voltage is high according to the fourth embodiment shown in FIG. 7.
Figure 8B:
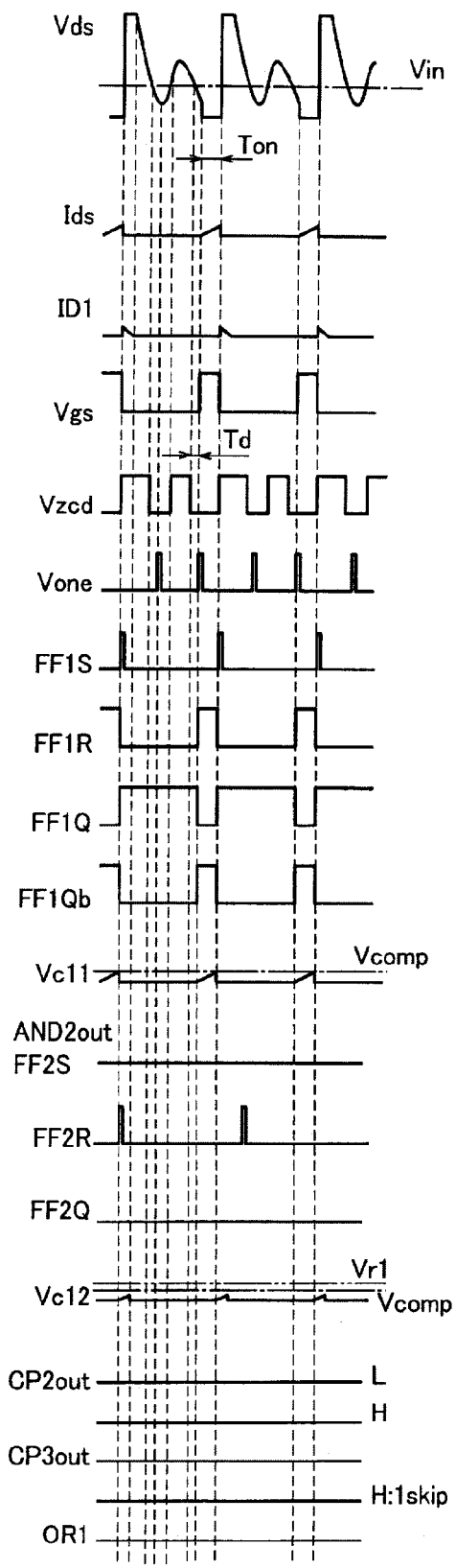
Figure 8C:
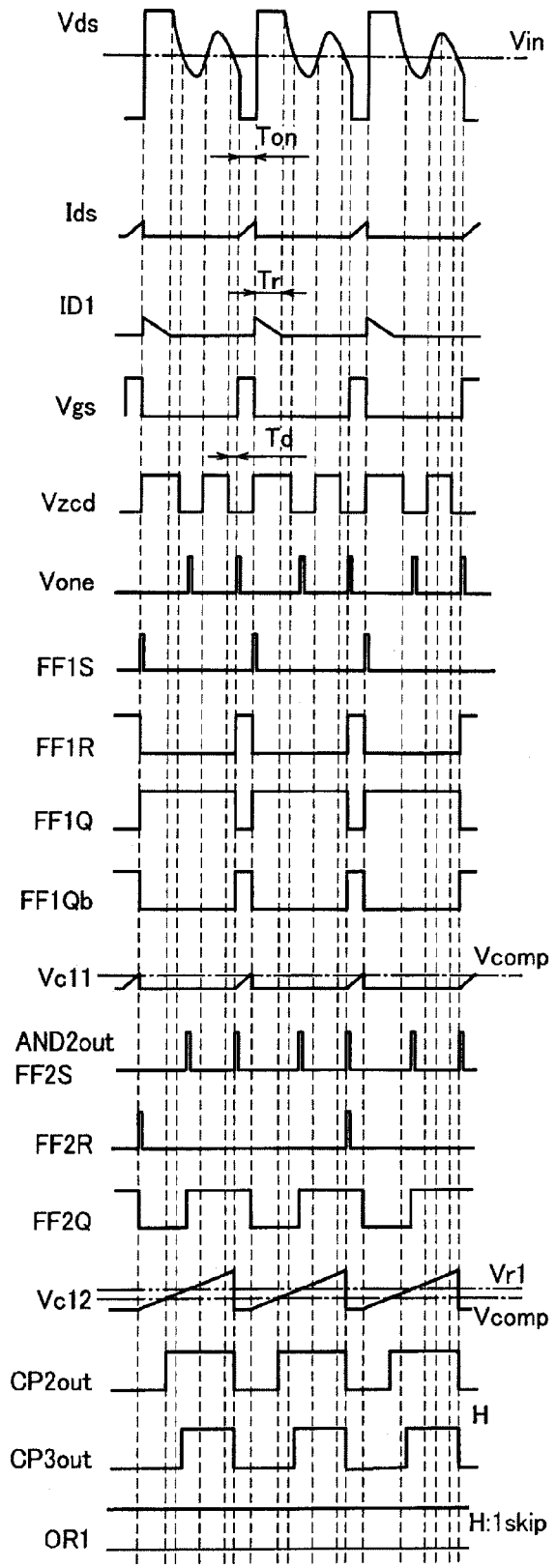

FIG. 8B illustrates 1-skip control in a case where an input voltage is low, and FIG. 8C illustrates 1-skip control in a case where the input voltage is high. Therefore, as shown in FIGS. 8A to 8C, in a light load state, one bottom of the switching element Q11 can be controlled to be skipped regardless of whether the input voltage is low or high. Therefore, even in a light load state, the power factor correction circuit can independently improve efficiency.

Additionally, when the load becomes a heavy load, the voltage of the COMP terminal is equal to or greater than the reference voltage Vr1. Therefore, the comparator CP3 determines that the load is a heavy load and outputs an L level to one terminal of the OR circuit OR1. Accordingly, the OR circuit OR1 outputs an output signal to the skip circuit 16, based on the output signal from the flip-flop circuit FF2.

As a result, similarly to the third embodiment, when a load is in a heavy load state, 0-skip control can be performed in a case where the input voltage is low and 1-skip control can be performed in a case where the input voltage is high, based on the signal of the regeneration period detection circuit 11.

Fifth Embodiment

Figure 9:
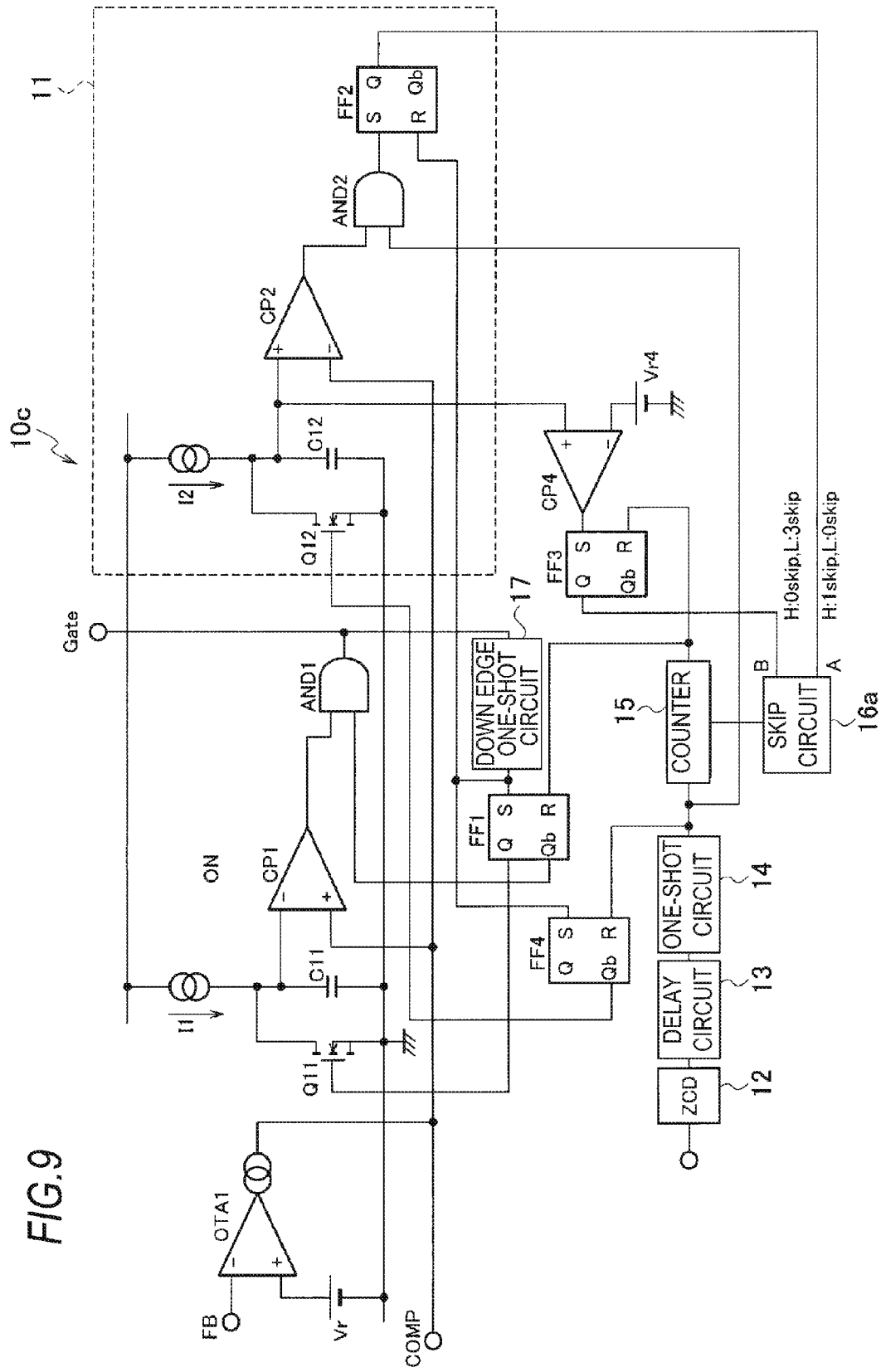
FIG. 9 is a detailed circuit diagram of a PFC controller for performing 3-skip control in a light load state of a power factor correction circuit according to a fifth embodiment of this disclosure.

FIG. 9 is a detailed circuit diagram of a PFC control circuit for performing 3-skip control in a light load state of a power factor correction circuit according to a fifth embodiment of this disclosure. The power factor correction circuit according to the fifth embodiment of this disclosure shown in FIG. 9 is characterized in that the PFC controller 10a shown in FIG. 5 is replaced with a PFC controller 10c and the skip circuit 16 is replaced with a skip circuit 16a.

The power factor correction circuit according to the fifth embodiment is a specific example of the power factor correction circuit according to the second embodiment. In the PFC controller 10c, a comparator CP4 and flip-flop circuits FF3 and FF4 are further provided, in addition to the configuration of the PFC controller 10a.

The comparator CP4 forms a light load determination unit for determining whether or not a load is a light load based on a predetermined output voltage. The comparator CP4 is configured to output an L level when a voltage of a capacitor C12 is less than or equal to a reference voltage Vr4 and to output an H level when the voltage of the capacitor C12 is greater than the reference voltage Vr4, to a set terminal S of the flip-flop circuit FF3. In order to determine a light load, the reference voltage Vr4 is set to be lower than a variation of voltage of the capacitor C12 in a heavy load state.

A set terminal S of the flip-flop circuit FF3 is connected to an output terminal of the comparator CP4, a reset terminal R of the flip-flop circuit FF3 is connected to an output terminal of a counter 15, and an output terminal Q of the flip-flop circuit FF3 is connected to a terminal B of the skip circuit 16a.

A set terminal S of the flip-flop circuit FF4 is connected to a reset terminal R of the flip-flop circuit FF2 and to an output terminal of a down edge one-shot circuit 17, a reset terminal R of the flip-flop circuit FF4 is connected to an output terminal of an one-shot circuit 14, and an inverting output terminal Qb of the flip-flop circuit FF4 is connected to a gate of the transistor Q12.

The skip circuit 16a outputs the number of skips, such as that shown in FIG. 10, to the counter 15 when an H level or an L level is input to a terminal A and a terminal B. More specifically, the skip circuit 16a outputs a 1-skip when an H level is input both to the terminals A and B, outputs a 1-skip when an H level is input to the terminal A and an L level is input to the terminal B, outputs a 0-skip when an L level is input to the terminal A and an H level is input to the terminal B, and outputs 3-skip when an L level is input both to the terminals A and B.

Figure 11A:
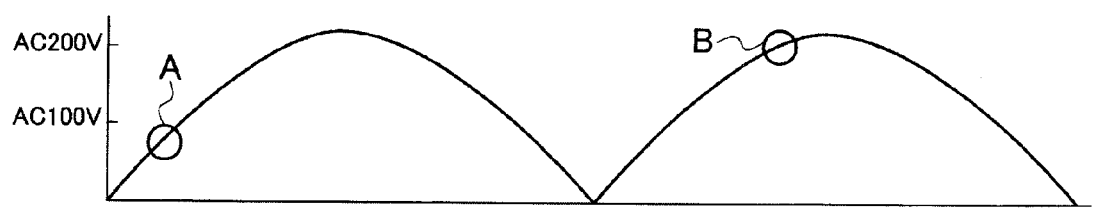

Operations of the PFC controller 10c according to the fifth embodiment, configured in this way, will be described. First, 3-skip control (FIG. 11B) performed in a case where the input voltage is low and 1-skip control (FIG. 11C) performed in a case where the input voltage is high, in a light load state, will be described with reference to FIGS. 11A to 11C.

First, in a case where the input voltage is low, the comparator CP2 outputs an L level to the AND circuit AND2 all the time, as described in the third embodiment, and thus the flip-flop circuit FF2 outputs an L level to the terminal A of the skip circuit 16a.

Since the voltage of the capacitor C12 is less than or equal to the reference voltage Vr4, the comparator CP4 determines that a load is a light load and then outputs an L level to the terminal B of the skip circuit 16a through the flip-flop circuit FF3. Accordingly, since the skip circuit 16a outputs 3-skip to the counter 15, the switching element Q1 is turned on at a timing of a bottom after three bottoms skipped from an initial bottom.

Next, in a case where the input voltage is high, the comparator CP2 always outputs an H level to the AND circuit AND2, as described in the third embodiment, and thus the flip-flop circuit FF2 outputs an H level to the terminal A of the skip circuit 16a. When it is determined by the comparator CP4 that the load is in a light load state, an L level is output to the terminal B of the skip circuit 16a. Accordingly, since the skip circuit 16a outputs a 1-skip to the counter 15, the switching element Q1 is turned on at a timing of a bottom after one bottom skipped from an initial bottom.

Although not shown in the drawing, in a case where the input voltage is low, the comparator CP2 outputs an L level to the AND circuit AND2 all the time, and thus an L level is output from the regeneration period detection circuit 11 to the terminal A of the skip circuit 16a. The comparator CP4 determines that the load is a heavy load when the voltage of the capacitor C12 is greater than the reference voltage Vr4, and outputs an H level to the terminal B of the skip circuit 16a. In this case, the skip circuit 16a outputs 0-skip to the counter 15, and then the switching element Q1 is turned on in response to an initial bottom.

Although not shown in the drawing, in a case where the input voltage is high, the comparator CP2 outputs an H level to the AND circuit AND2 in a normal state, and thus an H level is output from the regeneration period detection circuit 11 to the terminal A of the skip circuit 16a. When it is determined by the comparator CP4 that the load is in a heavy load state, an H level is output to the terminal B of the skip circuit 16a. Accordingly, since the skip circuit 16a outputs a 1-skip to the counter 15, the switching element Q1 is turned on at a timing of a bottom after one bottom skipped from an initial bottom.

As described above, in accordance with the power factor correction circuit according to the fifth embodiment, when it is determined by the light load determination unit, which a load is a light load and when an ON time period is greater than a regeneration period of a current flowing through a reactor, the bottom skip controller turns on a switching element at a timing when a next bottom is reached after plural bottoms skipped from an initial bottom. Therefore, it is possible to independently control the power factor correction circuit, thereby improving efficiency.

The present invention may be used in switching power supply devices.

What is claimed is:

1. A power factor correction circuit, which is capable of rectifying an AC voltage into a DC voltage, switching the DC voltage through a series circuit of a reactor and a switching element, and obtaining a predetermined output voltage by rectifying and smoothing regeneration energy of the reactor, comprising:
    an ON time setting circuit, which sets an ON time period of the switching element based on the predetermined output voltage;
    a bottom detection circuit, which detects a bottom when a voltage between both ends of the switching element is damped-oscillated while the switching element is being turned off; and
    a bottom skip controller, which
    causes the switching element to perform quasi-resonant if a ratio of the ON time period set by the ON time setting circuit to a regeneration period of a current flowing through the reactor while the switching element is being turned off is less than or equal to a predetermined value, and
    turns on the switching element at a timing when a next bottom is reached after one bottom skipped from an initial bottom if the ratio is greater than the predetermined value.

2. The power factor correction circuit according to claim 1, further comprising
    a light load determination circuit, which determines whether or not a load is a light load, based on the predetermined output voltage,
    wherein the bottom skip controller turns on the switching element at a timing when a next bottom is reached after one bottom skipped from an initial bottom if the light load determination circuit determines that the load is a light load.

3. The power factor correction circuit according to claim 1, further comprising
    a light load determination circuit, which determines whether or not a load is a light load, based on the predetermined output voltage,
    wherein the bottom skip controller turns on the switching element at a timing when a next bottom is reached after plural bottoms skipped from an initial bottom if the light load determination circuit determines that the load is a light load and the ON time period is greater than the regeneration period of the current flowing through the reactor.

* * * * *